Sept. 8, 1970   H. NIELSEN ET AL   3,526,984
LIGHTED FIREPLACE AND FIRE NOISE SIMULATOR
Filed March 22, 1968   3 Sheets-Sheet 1
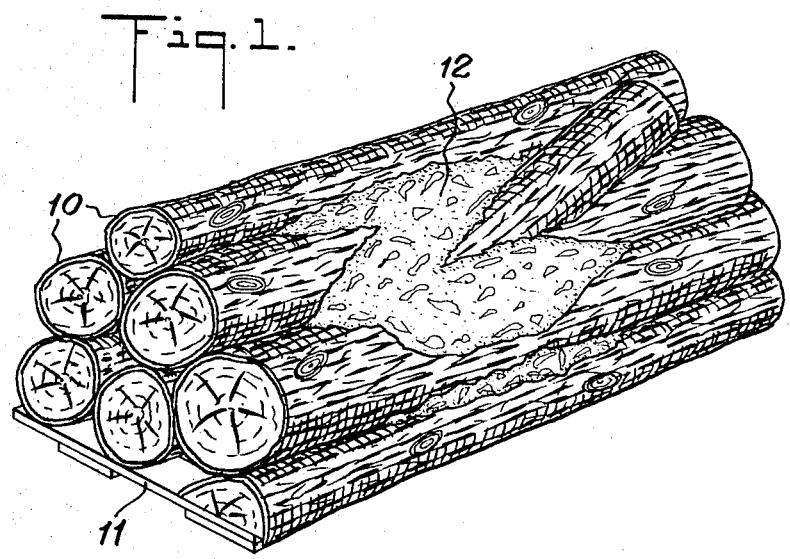
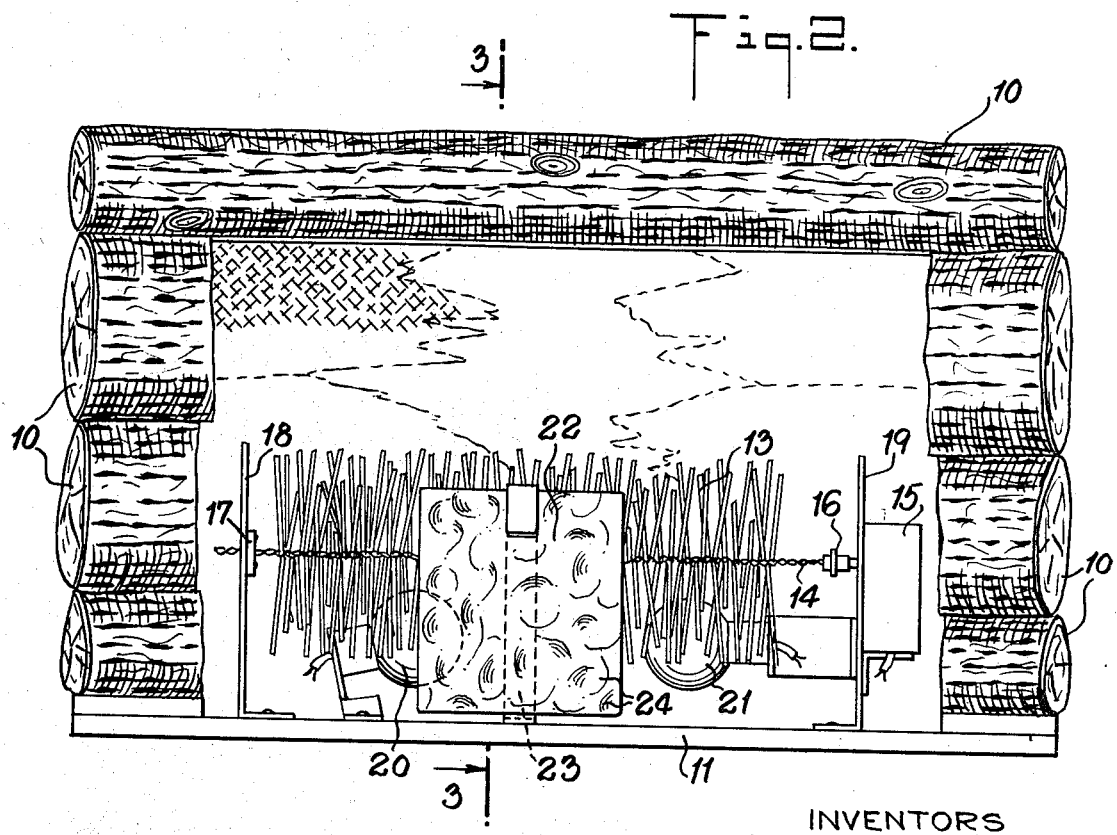
INVENTORS
HERMAN NIELSEN
STEPHEN S. VALLIANT
BY
Lorimer P. Brooks
ATTORNEY

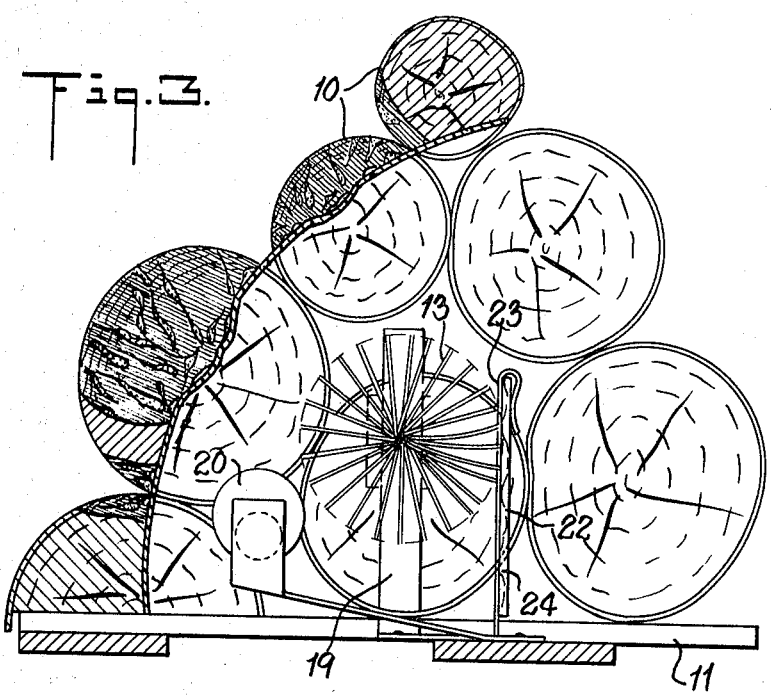
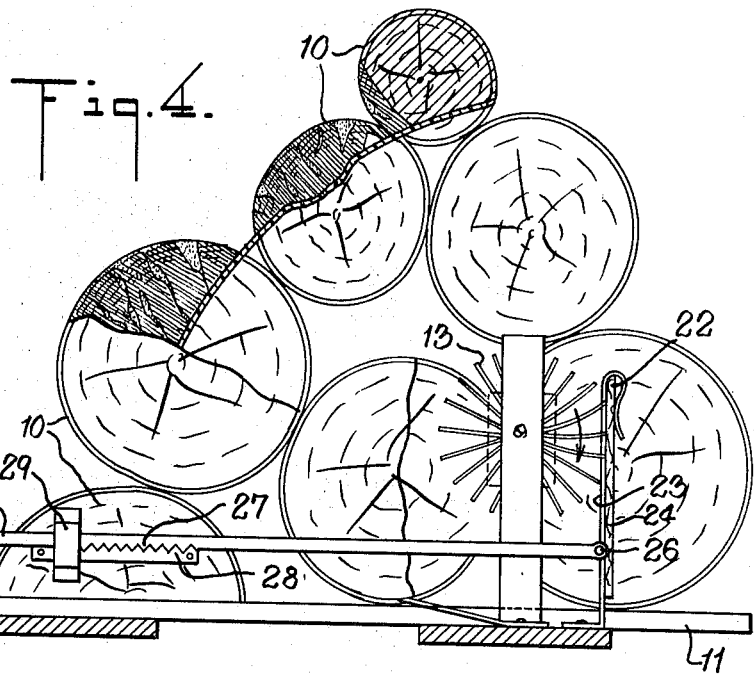

INVENTORS
HERMAN NIELSEN
STEPHEN S. VALLIANT
BY
ATTORNEY

3,526,984
LIGHTED FIREPLACE AND FIRE NOISE SIMULATOR
Herman Nielsen, Tuckahoe, N.Y., and Stephen S. Valliant, Greenwich, Conn., assignors to Drum Fire, Inc., Tuckahoe, N.Y., a corporation of New York
Filed Mar. 22, 1968, Ser. No. 715,416
Int. Cl. G09f 13/34; A63j 5/04, 5/02
U.S. Cl. 40—106.52                                           7 Claims

ABSTRACT OF THE DISCLOSURE

A fire noise simulator in a lighted fireplace fire simulator comprising a first member having a multiplicity of relatively long and narrow, flexible and resilient fingers extending therefrom, a second member engageable with said fingers and means for moving one of said members so as to cause the fingers to brush across a surface of the second member.

---

This invention relates to a fire noise simulator particularly useful in fireplace devices which simulate a fire of wood or other combustible material.

There are various devices in the prior art for simulating fires of wood, coal, etc., so as to provide means which may be placed in fireplaces or other places to provide a fire simulating effect without actually providing flames or causing combustion. Generally speaking, such devices are substantially noiseless, and while they may be effective in providing the desired flame or glowing ember effect, they do not provide another effect which normally accompanies a fire, namely the crackling and hissing which accompany a burning article, particularly a piece of wood. One object of the invention is to provide a relatively simple and inexpensive device which will simulate the crackling and hissing or rushing noises of a natural fire.

In accordance with the invention, a first member having a multiplicity of relatively long and narrow, flexible and resilient fingers is placed adjacent a second member having a surface engageable with the fingers, and one of these members is moved with respect to the other so as to cause the fingers to brush across the surface of the second member. Preferably, the second member is relatively thin and sheet-like and has a surface area greater than the surface which engages the fingers so as to provide amplification of the sound effects. Preferably also, the surface which is engageable with the fingers has a plurality of projecting or protruding portions thereon which cause a simulation of a crackling or snapping noise and a larger area of engagement with the fingers.

In the preferred form of the invention, the noise simulator forms part of the fireplace device described in the copending application of Adolph J. Mungo entitled "Fireplace Flame Simulating Device" and filed Mar. 22, 1968, Ser. No. 715,395. However, as described hereinafter, the noise simulator may form part of other well-known types of fireplace devices, such as the fireplace device described in U.S. Pat. No. Re. 24,399.

Other objects and advantages of the invention will be apparent from the following detailed description of preferred embodiments thereof, which description should be considered in conjunction with the accompanying drawings in which:

FIG. 1 is a front perspective view of a fireplace device incorporating the fire noise simulator of the invention;

FIG. 2 is an enlarged, rear elevation view of the device shown in FIG. 1;

FIG. 3 is a cross-sectional side elevation view of the fireplace device shown in FIGS. 1 and 2 and is taken along the line 3—3 in FIG. 2;

FIG. 4 is a cross-sectional side elevation view of a modified form of the fireplace device illustrated in FIG. 3;

Figure 5:
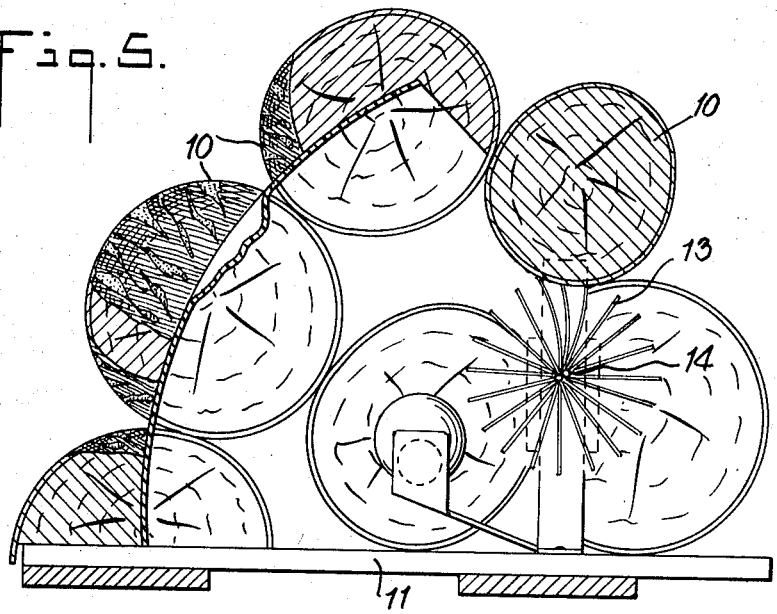
FIG. 5 is a cross-sectional side elevation view of a further modified form of a fireplace device incorporating the noise simulator of the invention.

FIGS. 1 through 5 illustrate a fireplace device described in greater detail in said copending application of Adolph J. Mungo, which fireplace device comprises a plurality of logs or sticks 10, either natural or artificial, which are secured together in any conventional manner. The logs or sticks 10 represent combustible material but instead of logs or sticks, the combustible material may be in other well-known forms, such as in the form of coal or coke.

The logs or sticks 10 are mounted in any conventional manner on a suitable base 11 and a central opening is provided therein which is covered by a translucent or translucent and partially transparent member 12. The function of the translucent member 12 is to diffuse the light so that the flame simulator therebehind is not directly visible although light reflected thereby can be seen therethrough.

The flame simulating member comprises a multiplicity of fingers 13 extending substantially radially outwardly in a multiplicity of directions from a rotatable shaft 14 which is rotatable by a motor 15 coupled thereto by a flexible coupling 16. The rotatable shaft 14 is supported near the end thereof by a bearing 17 mounted on a bracket 18 supported from the base 11. The motor 15 is also supported on a bracket 19 mounted on the base 11 and a pair of lamps 20 and 21 are also mounted by suitable brackets on the base 11. Preferably the lamps 20 and 21 are colored so as to provide light of a desired color, e.g. red, orange, yellow, etc.

The speed of rotation of the shaft 14 is chosen so as to provide the desired flame effect. For example, the shaft 14 may be rotated at a relatively low speed such as 20 revolutions per minute or may be rotated at speeds as high as 100 revolutions per minute. Preferably, the shaft speed is between 40 and 60 revolutions per minute. To provide the desired flame effect, the direction of rotation of the shaft 14 is counter clockwise when viewed from the end at which the motor 15 is positioned.

As described in said copending application, the rotatable member comprising the shaft 14 and the fingers 13 are constructed so that it has a brush-like appearance, and it may be manufactured by techniques well known in the brush-making industry and employed for making circular or cylindrical brushes and for the branches of an artificial Christmas tree. The fingers 13 have mirror-like reflecting surfaces and may, for example, be made of aluminum foil which is highly polished on at least one side thereof. For example, the fingers 13 may be made of aluminum foil $\frac{1}{1000}$ of an inch thick and may be approximately $\frac{3}{32}$ of an inch wide and 2½ inches long. The hardness of the foil is such that the fingers are self-sustaining, i.e., will remain substantially erect although otherwise unsupported. The fingers are flexible and resilient and preferably there are at least 10 radially extending fingers 13 along each inch of the shaft 14 in the axial direction thereof. Although as many as 100 fingers per inch may be used, not more than 50 per inch are normally used.

In the preferred form of the invention, the rotatable member comprising the shaft 14 and the fingers 13 also form the first member of the fire noise simulator. The second member comprises the sheet 22 secured to the strip 23 at the front and top thereof and adjustable in position toward and away from the fingers 13 by means of the bendable strip 23 secured to the base 11. Preferably the strip 23 is made of bendable metal able to withstand many bendings thereof and which when bent will retain substantially the position to which it is bent. The upper end of the strip 23 extends over the upper edge of the sheet 22 and in back thereof so as to securely hold the sheet 22 in the desired position.

The sheet 22 may be made of many different materials, such as plastic, metal, wood, etc. However, one of the best materials which we have thus far found is a sheet of polyvinyl chloride plastic approximately 0.010 inch thick.

As best seen in FIG. 3, a portion of the front surface of the sheet 22 engages the fingers 13 so as to bend and deflect them as the shaft 14 is rotated. Although the surface area of the sheet 22 may be only as large as that required to engage the fingers 13, preferably the surface area of the sheet 22 is substantially larger because it has been found that a sheet of larger area provides an amplification of the sound produced by the brushing of the fingers 13 thereacross and therefore makes the noise produced by such brushings louder and more audible.

Also, although the front surface of the sheet 22 which engages the fingers 13 may be plane, it has been found that more pleasing and more audilbe noises are produced if the surface thereof which engages the fingers 13 has a plurality of projecting or protruding portions 24 thereon which produce a slapping effect, greater bending of the fingers 13 and a greater area of contact therewithin. If the sheet 22 is of a relatively thin, plastic material such as cellulose acetate or polyvinyl chloride, the projections or protrusions may be formed by vacuum molding of the sheet. The projections 24 may be uniform or of random height and spacing, the height thereof above the base of the sheet 22 preferably being in the range of one-half to one inch.

In the modified form of the invention shown in FIG. 4, the position of the sheet 22 with respect to the fingers 13 is adjustable from the front of the fireplace device by means of the rigid strip 25 which extends from the front of the fireplace device to the bendable strip 23 to which it is connected by a pivotal connection 26. Generally, when the position of the sheet 22 is adjusted with respect to the fingers 13 so as to provide the desired noise effect, it is unnecessary to make further adjustments thereof and therefore, the arrangement shown in FIG. 3 is normally satisfactory. However, the type and volume of the noise may be adjusted by moving the sheet 22 toward and away from the fingers 13. Thus, the type of noise changes and increases in volume as the sheet 22 is moved toward the fingers 13, whereas the type of noise and the volume thereof decrease as it is moved away. On the other hand, depending upon the volume of the background noise in the room adjacent to the fireplace, it may be desirable to adjust the type and level of the fire noise and, for convenience purposes, the arrangement shown in FIG. 4 for adjusting the position of the sheet 22 may be employed.

The rigid strip 25 shown in FIG. 4 has a plurality of teeth 27 thereof which are engageable with the teeth on a strip 28 secured to one of the logs 10. The strip 25 passes through an opening in a bracket 29, such opening being large enough to permit lifting of the strip 25 and disengagement of the teeth 27 thereof from the teeth on the strip 28. Thus, the strip 25 may be moved forward or backward to adjust the position of the sheet 22 with respect to the fingers 13, and once it is set to the desired position, it will remain there due to the engagement of the teeth 27 with the teeth on the strip 28.

Although in the preferred form of the invention a separate relatively thin sheet 22 is provided in the path of the fingers 13, it has been found to be possible to obtain a similar fire noise effect by merely having the fingers 13 brush against another object mounted on a device. For example, the shaft 14 and the fingers 13 may be mounted so that the fingers 13 brush against one of the logs or sticks 10 as shown in FIG. 5. It has been found that as such fingers 13 brush against the log or stick 10, they produce a fire noise simulating effect which, although not as desirable as that produced with the sheet 22, is acceptable under some conditions.

Although the fingers 13 in the preferred embodiment illustrated in FIGS. 1–4 are made of aluminum foil having at least one highly polished surface so as to provide the desired flame effect, it is of course not necessary that they be made of aluminum foil or have a highly polished surface for the purpose of producing the noise effect. Accordingly, the fingers 13 for the purpose of producing the fire noise effect may be made of various materials. For example, they may be made of thin steel strips, steel wire, brass wire or strip, fiber, plastic and similar materials. As pointed out above, the fingers should be relatively long and narrow, flexible and resilient. Also, the material selected should provide a relatively hard surface for the fingers, not only for wear purposes but also to provide the desired noise effect. The dimensions of the fingers 13 will, of course, be dependent upon the material employed to make the fingers and, while they may be of a relatively small size, generally they will not be larger than ¼-inch in width. One example of dimensions which have been found to be satisfactory with aluminum foil is set forth above.

Figures 6, 7:
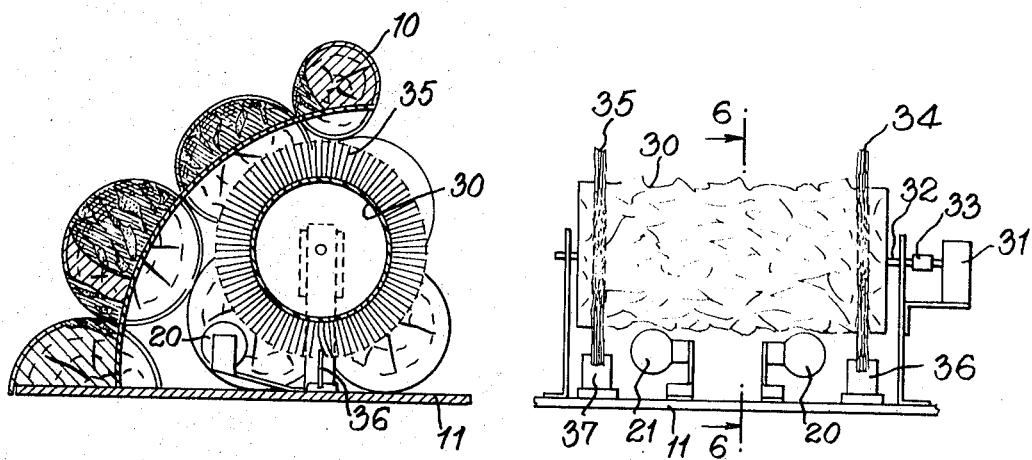
FIGS. 6 and 7 are respectively cross-sectional side elevation and partial front elevation views of a different form of fireplace device incorporating the noise simulator of the invention.
Figure 8:
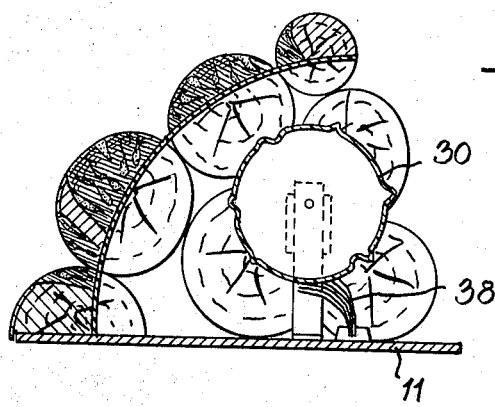
FIG. 8 is a cross-sectional, side elevation view of the fireplace device shown in FIGS. 6 and 7 with a modified form of the noise simulating device of the invention.

Since the embodiments shown in FIGS. 1–5 require only the addition of a second member to the parts normally employed in the fireplace device, the embodiments shown in these figures are preferred. However, it is also possible to use the noise simulator with other types of fireplace devices or to incorporate the first and second members as a unit in any fireplace device. FIGS. 6–8 illustrate embodiments of the invention which may be employed with a fireplace device of the type shown and described in U.S. Reissue Pat. No. Re. 24,399.

FIGS. 6 and 7 illustrate a plurality of logs or sticks 10 representing the combustible material and mounted on the base 11. Also mounted on the base 11 is a cylinder 30 of the type described in said patent and having a highly polished and irregular outer surface. The cylinder 30 is rotatable by means of a motor 31 coupled to the shaft 32 on which the cylinder 30 is mounted to a flexible coupling 33. Normally the cylinder is formed from a relatively thin sheet of aluminum foil either with or without a supporting material or laminated to a sheet of paper. The surface is indented in a random manner so that there are a plurality of protrusions or projections on the surface.

One or more sets of fingers 34 and 35 which are the same as the fingers 13 described above are mounted on the cylinder 30 at the ends thereof and are secured thereto so as to rotate therewith. A pair of relatively thin sheets 36 and 37, such as thin sheets of material described above for the sheet 22, are mounted on the base 11 in any suitable manner in positions such that they engage the fingers 34 and 35 as the cylinder 30 is rotated. The brushing of the fingers 34 and 35 across the surfaces of the sheets 36 and 37 produces noises which are similar in effect to fire noises and to the noises produced by the fire noise simulator described above in connection with FIGS. 1–5.

Instead of mounting the fingers on the cylinder 30 as shown in FIGS. 6 and 7, the fingers may be mounted on the base 11 in a position such that they engage the irregular surface of the cylinder 30. Thus, as shown in FIG. 8, a set of fingers 38 which may be the same as the fingers 13 described above and which extend a substantial distance along the length of the cylinder 30 in the axial direction thereof, are mounted on the base 11 in a position such that they engage the surface of the cylinder 30. In the arrangement shown in FIG. 8 as well as in the arrangement shown in FIGS. 6 and 7, the cylinder 30, being hollow and preferably being substantially closed at its ends, acts as a sound amplifier and makes the sounds of the fingers 38 brushing across the surface of the cylinder 30 more audible.

Since the fingers 34, 35, 38 shown in FIGS. 6-8 are not required to provide the flame simulating effect, they may, as described above, be made of materials other than aluminum foil and other than materials having a highly polished surface. However, if desired, a material with a highly polished surface may be employed for such fingers, and if in the embodiment shown in FIGS. 6 and 7 they are placed so that light is reflected therefrom, they will contribute to the flame effect produced by the cylinder 30.

Although, as described above, it is preferred to have at least 10 fingers per inch in the various embodiments, it will be apparent to those skilled in the art that as long as the number of fingers striking the surface of the second member per second is properly selected, the desired noise effect will be obtained. For example, if the set of fingers is relatively long and each of them engages a surface of the second member within a short period of time, the number of fingers per inch may be less than that described above. However, in order to obtain the desired effect, the number of fingers engaging the surface of the second member should be at least 10 per second.

While the invention has been described with reference to the preferred forms thereof, it will be understood by those skilled in the art, after understanding the invention, that modifications and changes may be made therein without departing from the spirit and scope of the invention as defined by the claims appended hereto.

What is claimed as new and what we desire to secure by Letters Patent of the United States is:

1. A fireplace device comprising a first member having the appearance of combustible material and having a light-transmitting portion, a rotatable second member mounted behind said first member and having thereon and extending therefrom a multiplicity of relatively long and narrow, flexible and resilient fingers, said fingers having mirror-like, light reflecting surfaces spaced from the axis of rotation of said second member, said surfaces being oriented in a plurality of different directions, means for rotating said second member, means for projecting light on said surfaces in a direction causing reflection of said light from said surfaces toward said light-transmitting portion as said second member is rotated, and a relatively thin sheet mounted adjacent the periphery of said second member with its surface engageable with said fingers at portions thereof spaced from the axis of rotation of said second member to produce fire noise simulation.

2. A fireplace device as set forth in claim 1 wherein said sheet has a plurality of protruding portions engageable with said fingers.

3. A fireplace device as set forth in claim 1 further comprising means for adjusting said sheet toward and away from said fingers.

4. A fireplace device comprising a first member having the appearance of combustible material and having a light-transmitting portion, a rotatable second member mounted behind said first member and having thereon and extending therefrom a multiplicity of relatively long and narrow, flexible and resilient fingers, at least the majority of said fingers having mirror-like, light reflecting surfaces spaced from the axis of rotation of said second member, said surfaces being oriented in a plurality of different directions, means for rotating said second member, means for projecting light on said surfaces in a direction causing reflection of said light from said surfaces toward said light-transmitting portion as said second member is rotated, and a third member mounted adjacent the periphery of said second member with its surface engageable with a plurality of said fingers at portions thereof spaced from the axis of rotation of said second member to produce fire noise simulation.

5. A fireplace device comprising a first member having the appearance of combustible material and having a translucent portion, a rotatable second member mounted behind said first member, said second member having an axis of rotation and a multiplicity of fingers extending radially outwardly from said axis, said fingers being closely spaced circumferentially and longitudinally of said axis so as to form a generally cylindrical brush-like member, any given portion of whose area presents a generally uniform array of said fingers, each of said fingers having at least one mirror-like face which faces toward said translucent portion during a portion of the rotation of said second member, means for rotating said second member, means for projecting light on the mirror-like faces of said fingers in a direction causing reflection of said light from said faces and toward said translucent portion, and a relatively thin sheet mounted adjacent the periphery of said second member with its surface engageable with said fingers at portions thereof spaced from the axis of rotation of said second member to produce fire noise simulation.

6. A fireplace device comprising a first member having the appearance of combustible material and having a light-transmitting portion, a rotatable second member mounted behind said first member, said second member having generally the shape of a hollow, thin-walled cylinder with a mirror-like, light-reflecting exterior surface, said surface being indented irregularly to provide a plurality of light-reflecting surfaces oriented irregularly and in a plurality of different directions, means for rotating said second member, means for projecting light on said surfaces in a direction causing reflection of said light from said surfaces toward said light-transmitting portion as said second member is rotated, and a multiplicity of relatively long and narrow, flexible and resilient fingers mounted adjacent the periphery of said second member with the free ends of said fingers engageable with said irregularly oriented surfaces to provide fire noise simulation.

7. A fireplace device as set forth in claim 6 wherein said cylinder is formed from polished aluminum foil.

References Cited

UNITED STATES PATENTS

| | | | |
|---|---|---|---|
| Re. 24,399 | 12/1957 | Brooks | 40—106.53 |
| 2,684,244 | 7/1954 | Brooks | 40—106.53 |
| 2,984,032 | 5/1961 | Cornell | 40—106.52 |
| 928,070 | 7/1909 | Rousselot | 272—14 |
| 1,004,060 | 9/1911 | Moorhouse | 272—14 |
| 1,100,833 | 6/1914 | Lapin | 272—14 |
| 2,733,528 | 2/1956 | Miller et al. | |
| 3,120,717 | 2/1964 | Glass et al. | 272—8 X |
| 3,120,718 | 2/1964 | Glass et al. | 272—8 X |

FOREIGN PATENTS

| | | |
|---|---|---|
| 634,194 | 1/1962 | Canada. |
| 11,520 | 3/1910 | France. |

ANTON O. OECHSLE, Primary Examiner

A. W. KRAMER, Assistant Examiner

U.S. Cl. X.R.

40—28.1; 272—8, 14, 15